United States Patent [19]

Ha

[11] Patent Number: 5,172,462
[45] Date of Patent: Dec. 22, 1992

[54] SPRING COMPRESSION DEVICE

[76] Inventor: Tae-Hong Ha, 457-4, Jangan-Dong, Dongdaemoon-Ku, Rep. of Korea

[21] Appl. No.: 864,643

[22] Filed: Apr. 7, 1992

[30] Foreign Application Priority Data

Jul. 16, 1991 [KR] Rep. of Korea .................... 91-11063

[51] Int. Cl.⁵ ............................................ B23P 19/04
[52] U.S. Cl. .................................................. 29/227
[58] Field of Search ................. 29/225, 227, 215–218; 254/10.5

[56] References Cited

U.S. PATENT DOCUMENTS 3,883,116  5/1975  Buccina ............................. 254/10.5
3,902,698  9/1975  Furrer et al. ....................... 254/10.5
4,558,500  12/1985  Kloster ................................. 29/227

Primary Examiner—Robert C. Watson
Attorney, Agent, or Firm—James D. Hall

[57] ABSTRACT

Disclosed herein is an improved device for speedily compressing a shock absorber spring employed in a vehicle suspension system and minimizing any twisting of the spring during the compression operation. The spring compression device comprises a hollow post, a housing detachably attached to the hollow post and having a clamp for gripping a shock absorber unit, a sliding bar movably mounted in the housing downward or upward, a pair of arcuate swing arms rotatably pivoted at a bracket of the sliding bar and a pair of inverted U-shaped arcuate grippers for clamping the absorber spring and slidably attached to end regions of the swing arms.

7 Claims, 3 Drawing Sheets

SPRING COMPRESSION DEVICE

FIELD OF THE INVENTION

The present invention relates to a spring compressor; and, more particularly, to a device for speedily compressing a shock absorber spring which may be employed in a vehicle suspension system.

DESCRIPTION OF THE PRIOR ART

In general, in order to repair a shock absorber assembly or any component thereof, it is necessary to compress the shock absorber spring and remove same from the absorber assembly. Usually, a hand tool is used in compressing the coil spring.

Accordingly, various hand tools have been designed and used to compress the vehicle shock absorber spring. For example, U.S. Pat. Nos. 4,219,918 and 4,679,780 disclose tools for compressing a helical spring used in a vehicle suspension system by a wrench. However, in case of such spring compression tools, since the helical spring is compressed by a wrench, a spring compression process is not only cumbersome but also highly time consuming.

In U.S. Pat. No. 4,034,960, there is provided another spring compressor tool for compressing a shock absorber spring. The manufacturing cost of the compressor tool is, however, relatively high as it is made in a rather complicated structure.

In addition, U.S. Pat. No. 4,276,684 offers a hand tool for compressing a shock absorber spring by manual operation. However, this tool is handicapped by the excessive labor requirement of compressing and removing the spring from the shock absorber unit. Furthermore, such a hand tool is very inconvenient for the user/repairman to remove the spring from the unit because the spring compression must continue to be maintained by the manual working during the removal operation of the spring.

In Korean Utility Model Publication No. 85-412 issued to the present applicant, there is proposed another spring compression device. This device has the disadvantage in that the shock absorber spring may become twisted during the compression operation.

SUMMARY OF THE INVENTION

Accordingly, it is an object of the present invention to provide a novel spring compression device for speedily compressing a shock absorber spring which may be employed in a vehicle suspension system, with less labor.

It is another object of the present invention to provide a spring compression device for minimizing any twisting or deformation of the shock absorber spring during the compression operation.

It is a further object of the present invention to provide a spring compression device adapted for compressing various sizes of shock absorber springs.

The above and other objects of the present invention are accomplished by a spring compression device which comprises:

a base plate;

a hollow post secured to the base plate and having a spring accommodated therewithin;

a housing detachably fixed to a top portion of the hollow post, the housing having an adjustable nut suitable for supporting a lower portion of a shock absorber unit and means for clamping a middle portion of the unit wherein the adjustable nut and the clamping means are arranged on a substantially same vertical plane and in a parallel relationship with each other;

a sliding bar movably mounted in the housing and biased by the spring mounted in the hollow post, the sliding bar including a rack integrally formed thereon and a bracket fixed to an upper portion thereof, the bracket having a pair of spaced guide pins secured thereto;

a pair of arcuate swing arms rotatably pivoted at the guide pins of the bracket and having slots provided at end regions thereof;

a pair of inverted U-shaped arcuate grippers adapted for clamping a shock absorber spring and slidably attached to the slots of the swing arms, the grippers being formed of a helical configuration; and means for actuating the rack of the sliding bar, thereby moving the sliding bar downward or upward.

The swing arms are movably pivoted at the guide pins upward or downward. Also, the swing arms are arranged in a substantially helical relationship with each other so that they correspond to a helical configuration of the shock absorber spring.

The means for moving the sliding bar downward or upward includes a driving shaft rotatably mounted in a gear box provided to the housing and having a lead screw integrally formed thereon, a pinion formed at the driving shaft and meshed with the rack of the sliding bar, and a handle engaged with the lead screw. The driving shaft has a circular friction plate secured thereto and located adjacent to the pinion. Rotatably disposed between the friction plate and the handle are a first and a second circular friction disks for transmitting the rotational force created by the handle to the driving shaft, thereby moving the sliding bar downward and compressing the shock absorber spring. In addition, disposed between the first and the second disks is a ratchet wheel associated with a pawl for preventing the clockwise rotation of the driving shaft during the compression operation of the shock absorber spring.

BRIEF DESCRIPTION OF THE DRAWINGS

The above and other objects, advantages, and features of the present invention will become apparent from the following description, taken in conjunction with the accompanying drawings.

DETAILED DESCRIPTION OF THE INVENTION

Figure 1:
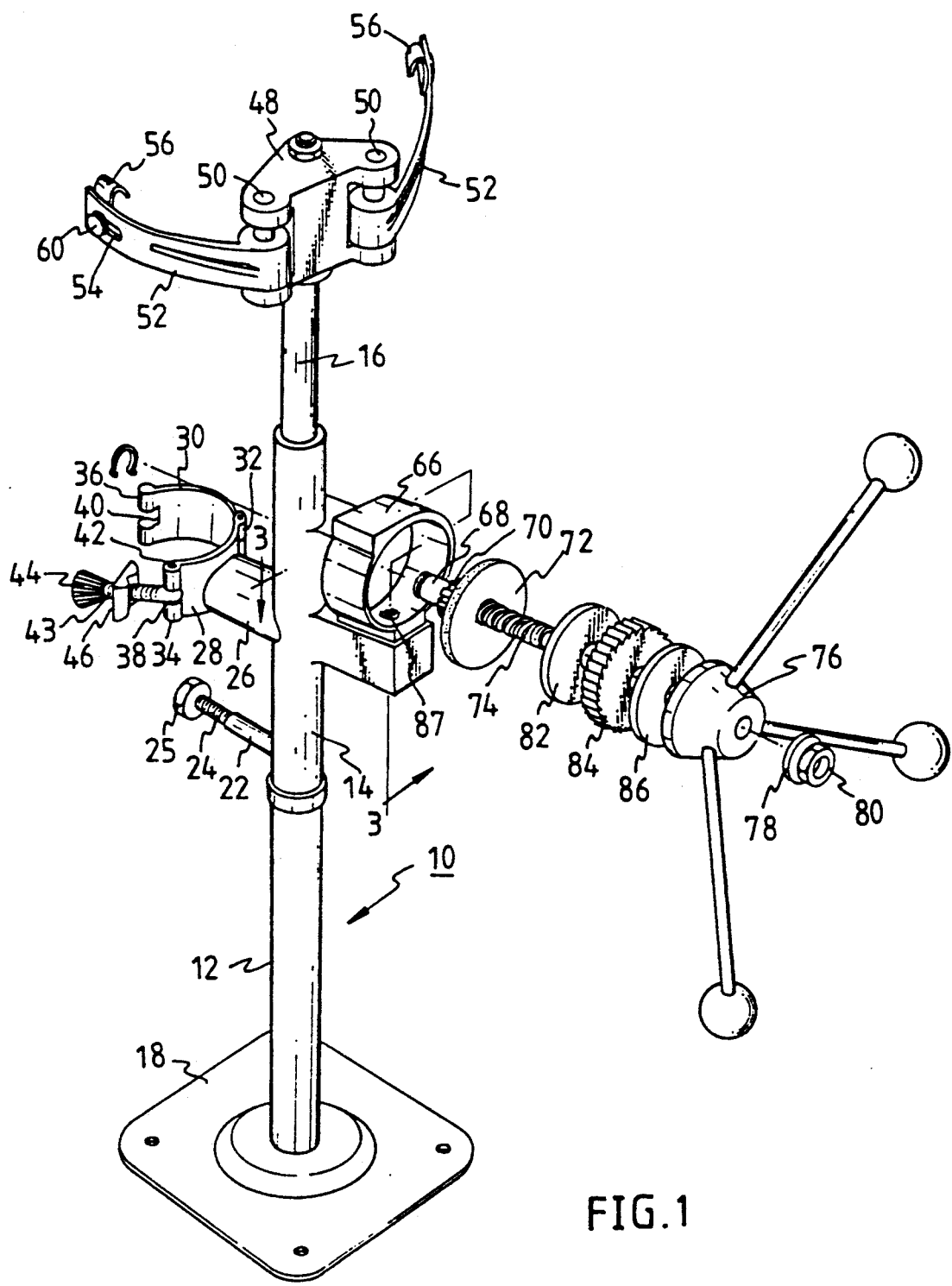
FIG. 1 is a partially exploded perspective view of a preferred spring compression device in accordance with the present invention.

Referring now to FIG. 1, there is shown a spring compression device 10 according to a preferred embodiment of the present invention, which comprises a hollow post 12, a housing 14 secured to the top portion of the hollow post 12 and a sliding bar 16 slidably mounted in the housing 14 downward or upward. The bottom portion of the hollow post 12 is fixed to a base plate 18, e.g., by welding or bolting, which may be installed on a floor.

Figure 4:
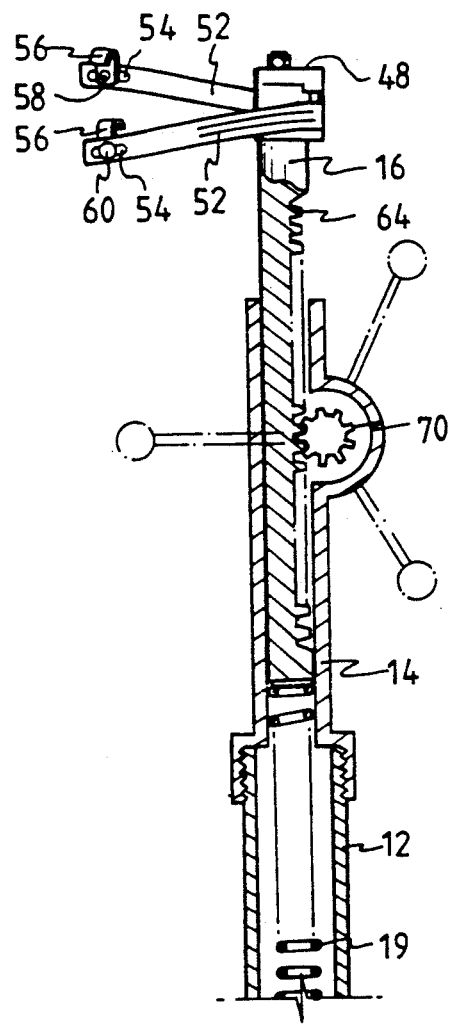
FIG. 4 is a partially sectional view of the spring compression device shown in FIG. 1 and shows an actuating mechanism for moving a sliding bar downward or upward.

As shown in FIG. 4, accommodated within the hollow post 12 is a coil spring 19 for holding the sliding bar 16.

Figure 2:
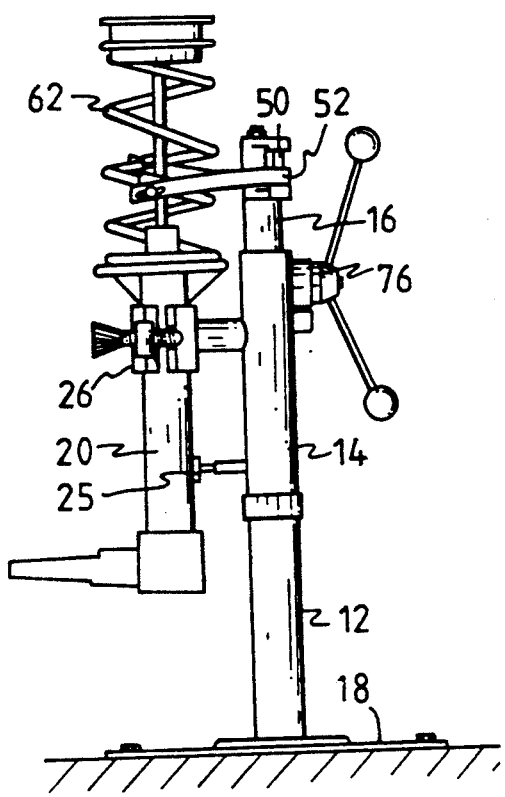
FIG. 2 is a side view of the spring compression device of FIG. 1 applied to a shock absorber spring.

As shown in FIGS. 1 and 2, the housing 14 includes means for supporting a lower portion of a shock absorber unit 20, which has a projecting portion 22 with a thread (not shown) formed therein and an adjustable nut 24 engaged with the thread of the projecting portion 22. The adjustable nut 24 has a head 25 suitable for supporting the shock absorber unit 20. Therefore, the nut 24 may be easily adjusted to support various sizes of shock absorber units by rotation.

In addition, the housing 14 includes a clamp 26 having two semi-cylindrical jaws 28, 30 adapted for gripping a middle portion of the unit 20. The clamp 26 and the adjustable nut 24 are arranged on a substantially same vertical plane and in a parallel relationship with each other. As shown in FIG. 1, the jaws 28, 30 are hinged together at 32. Provided at the end portions of the jaws 28, 30 are flanges 34, 36 having cut-out openings 38, 40. The flange 34 of one of the jaws 28 has a pin 42 secured thereto passing through the cut-out opening 38 thereof. Pivoted at the pin 42 is a bolt 43 having an adjusting nut 44 engaged therewith. A pad 46 is slidably inserted into the bolt 43 and serves to assist the coupling of the jaws 28, 30 as a spacer in gripping the shock absorber unit 20 (at this time, the cut-out opening 40 of the flange 36 receives the bolt 43). The jaws 28, 30 can clamp and release the absorber unit 20 through the rotation of the adjusting nut 44 associated with the bolt 43. The clamp 26 may grip different sizes of the absorber units by moving of the adjusting nut 44 along the bolt 43.

As shown in FIG. 1, the sliding bar 16 includes a bracket 48 mounted on the top portion thereof and having a pair of spaced guide pins 50. There are a pair of arcuate swing arms 52 slidably pivoted at the guide pins 50 in the upward and downward directions. The swing arms 52 have slots 54 provided at end regions thereof. Slidably attached to each of the respective slots 54 is an inverted U-shaped arcuate gripper 56 by a fastener, e.g., a bolt 58, and a nut 60, which is designed to accommodate and clip a shock absorber spring 62 to be compressed. Preferably, the grippers 56 may be formed of a convolution configuration corresponding to the shape of the shock absorber helical spring 62.

Figure 6:
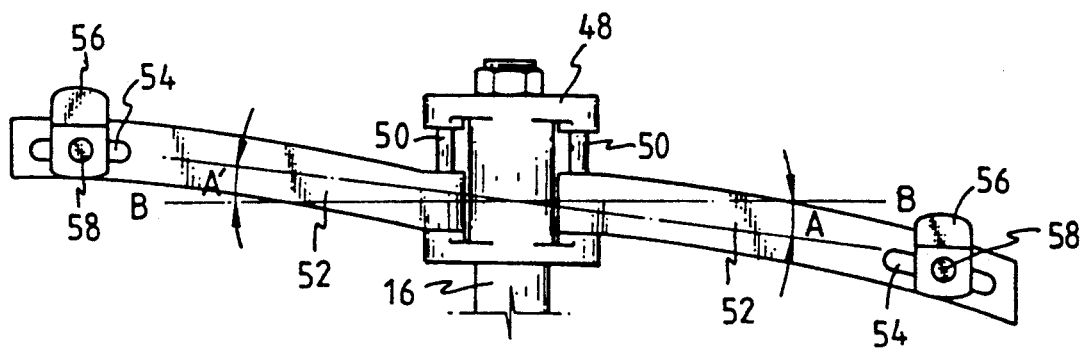
FIG. 6 is an elevational development view of a pair of arcuate swing arms of the spring compression device shown in FIG. 1.

As best shown in FIG. 6, one of the swing arms 52 is slightly oriented downward at an angle A and the other upward at the substantially same angle A' with respect to a reference plane B perpendicular to the guide pins 50, respectively, so that they conform to the helical configuration of the shock absorber spring 62. That is, the swing arms 52 are arranged in a substantially helical configuration relationship with each other. It is preferable that the angles A, A', generally, correspond to a pitch angle of the shock absorber spring 62.

Therefore, such helical formation of the grippers 56 and helical orientation of the swing arms 52 may minimize any twisting or deformation of the shock absorber spring 62 during the compression operation. Further, since the swing arms 52 are individually moved upward or downward in the spring compression, the effect of preventing the twisting of the shock absorber spring 62 is enhanced.

As described above, the grippers 56 may be adjusted to clip various sizes of shock absorber springs by changing the location of the bolts 58 in the slots 54.

Figure 3:
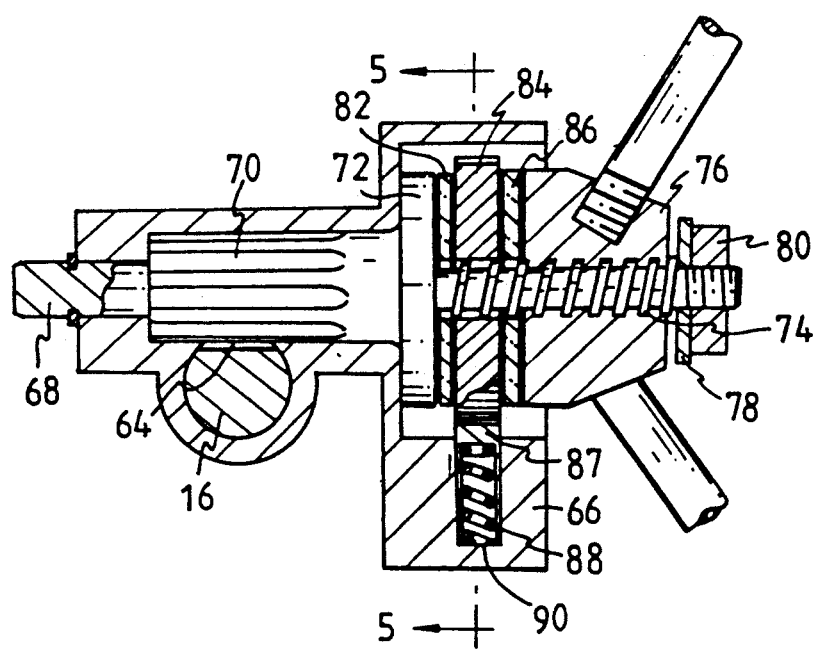
FIG. 3 is a partially sectional view taken along line 3—3 of FIG. 1.

As best shown in FIGS. 3 and 4, the sliding bar 16 has a rack 64 integrally formed thereon. As shown in FIGS. 1 and 3, provided to the housing 14 is a gear box 66 which is adapted to receive means for actuating the rack 64 of the sliding bar 16. The means for actuating the rack 64 includes a driving shaft 68 rotatably mounted in the gear box 66 and a pinion 70 formed at the driving shaft 68 and meshed with the rack 64 of the sliding bar 16. The driving shaft 68 includes a circular friction plate 72 fixed to a middle portion thereof and a lead screw 74 formed thereon along the right half thereof (see FIG. 3).

Threadedly engaged with the lead screw 74 is a handle 76 which is capable of being moved in the forward and backward directions along the lead screw 74 by the rotation thereof. On the other hand, in order to prevent the handle 76 from disengaging from the lead screw 74, a washer 78 and a nut 80 are fastened to the end of the driving shaft 68 in order. As shown in FIG. 3, rotatably disposed around the lead screw 74 and between the friction plate 72 and the handle 76 are, in series, a first circular friction disk 82, a ratchet wheel 84 and a second circular friction disk 86 arranged in an intimate relationship with each other, which serve to transmit the rotational force created by the handle 76 to the driving shaft 68 when the handle 76 is moved forward along the lead screw 74 by rotation.

Figure 5:
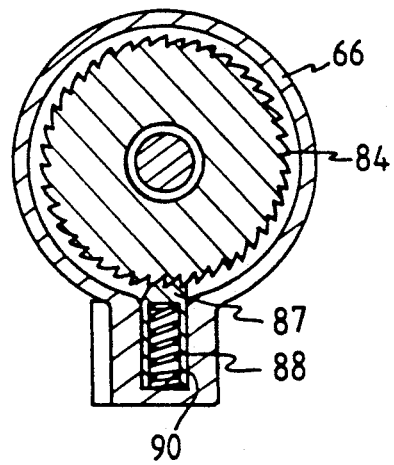
FIG. 5 is a sectional view taken along line 5—5 of FIG. 3 and shows a ratchet wheel engaged with a pawl in accordance with the present invention.

As best shown in FIG. 5, the ratchet wheel 84 is engaged with a pawl 87 which is biased by a coil spring 88 mounted in a groove 90 of the gear box 66. Therefore, as can be seen in FIG. 5, the ratchet wheel 84 may be rotated in one direction, i.e., in the counterclockwise direction.

As described above, when the handle 76 is rotated counterclockwise, it moves toward the friction plate 72, thereby pressing the first friction disk 82, the ratchet wheel 84 and the second friction disk 86 against the friction plate 72. As a result, rotating the handle 76 further will cause the driving shaft 68 to rotate in the counterclockwise direction because of the frictional force exerted on the plate 72 by the ratchet wheel 84 and the disks 82, 86, the torque of the driving shaft 68 being transferred to the rack 64 of the sliding bar 16 via the pinion 70. Accordingly, the sliding bar 16 is speedily moved in the downward direction, and, thereby, the shock absorber spring 62 is compressed.

In this connection, even if an operator stops the rotation of the handle 76 during or after the compression operation, the driving shaft 68 will not rotate clockwise due to the locking operation of the pawl 87 engaged with the ratchet wheel 84. Accordingly, the sliding bar 16 will not move upward and the shock absorber spring 62 will be maintained in the compressed condition.

In contrast, in order to release the compressed spring 62, the clockwise rotation of the handle 76 will cause the removal of the frictional force exerted on the plate 72 due to the backward movement of the handle 76 along the lead screw 74. At this time, the disks 82, 86 and the ratchet wheel 84 are spaced from the plate 72 with respect to each other. As a result, the driving shaft 68 becomes freely rotatable clockwise because of the release of the driving shaft 68 from the ratchet wheel 84. Consequently, the sliding bar 16 is moved upward by the restoring forces of the compressed coil spring 19 mounted in the hollow post 12 and the compressed shock absorber spring 62. In this case, the driving shaft 68 is caused to rotate clockwise, thereby moving the handle 76 in the forward direction along the lead screw 74 and pressing the disks 82, 86 and the ratchet wheel 84 against the friction plate 72. As a result, the driving shaft 68 becomes momentarily locked by the ratchet wheel 84 engaged with the pawl 87, and will not rotate clockwise. Therefore, the compressed shock absorber spring 62 is gradually restored whenever the handle 76 is rotated clockwise. Such locking mechanism will protect the operator against dangerous conditions which may be caused by an instantaneous release of the compressed absorber spring.

While the present invention has been shown and described with reference to particular embodiments, it will be apparent to those skilled in the art that many changes and modifications may be made without departing from the spirit and scope of the invention as defined in the claims that follow.

What is claimed is:

1. A spring compression device which comprises:
   a base plate;
   a hollow post secured to the base plate and having a spring accommodated therewithin;
   a housing detachably fixed to a top portion of the hollow post, the housing having an adjustable nut suitable for supporting a lower portion of a shock absorber unit and means for clamping a middle portion of the unit wherein the adjustable nut and the clamping means are arranged on a substantially same vertical plane and in a parallel relationship with each other;
   a sliding bar movably mounted in the housing and biased by the spring mounted in the hollow post, the sliding bar including a rack integrally formed thereon and a bracket fixed to an upper portion thereof, the bracket having a pair of spaced guide pins secured thereto;
   a pair of arcuate swing arms rotatably pivoted at the guide pins of the bracket and having slots provided at end regions thereof;
   a pair of inverted U-shaped arcuate grippers adapted for clamping a shock absorber spring and slidably attached to the slots of the swing arms, the grippers being formed of a helical configuration; and
   means for actuating the rack of the sliding bar, thereby moving the sliding bar downward or upward.

2. The compression device of claim 1, wherein said swing arms are movably pivoted at the guide pins in the upward and downward directions.

3. The compression device of claim 2, wherein said swing arms are arranged in a substantially helical relationship with each other so that they correspond to a helical configuration of the shock absorber spring.

4. The compression device of claim 3, wherein said clamping means includes a pair of semi-cylindrical jaws hinged together, one of which has a bolt rotatably pivoted at the end portion thereof wherein the bolt has an adjusting nut threadedly engaged therewith for tightening the jaws in clamping the shock absorber unit.

5. The compression device of claim 3, wherein said means for moving the sliding bar downward or upward includes a driving shaft rotatably mounted in a gear box provided to the housing and having a lead screw integrally formed thereon, a pinion formed at the driving shaft and meshed with the rack of the sliding bar, a circular friction plate carried by the driving shaft and located adjacent to the pinion, a handle engaged with the lead screw, a first and a second circular friction disks rotatably disposed between the friction plate and the handle and for transmitting the rotational force created by the handle to the driving shaft, and means for preventing the clockwise rotation of the driving shaft during the compression operation of the shock absorber spring.

6. The compression device of claim 5, wherein said preventing means includes a ratchet wheel rotatably disposed between the first and the second friction disks, a pawl engaged with the ratchet wheel and means for biasing the pawl against the ratchet wheel.

7. The compression device of claim 6, wherein said biasing means is a coil spring mounted in a groove of the gear box.

* * * * *